(12) United States Patent
Irle et al.

(10) Patent No.: US 11,909,282 B2
(45) Date of Patent: Feb. 20, 2024

(54) DEVICE, ARRANGEMENT AND METHOD FOR DETERMINING AN ANGLE BETWEEN A ROTOR AND A STATOR

(71) Applicant: HELLA GmbH & Co. KGaA, Lippstadt (DE)

(72) Inventors: Henning Irle, Lippstadt (DE); Fabian Utermoehlen, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 366 days.

(21) Appl. No.: 17/340,934

(22) Filed: Jun. 7, 2021

(65) Prior Publication Data

US 2021/0296976 A1   Sep. 23, 2021

Related U.S. Application Data

(63) Continuation of application No. PCT/EP2019/082840, filed on Nov. 28, 2019.

(30) Foreign Application Priority Data

Dec. 5, 2018 (DE) ................ 10 2018 130 972.4

(51) Int. Cl.
*G01B 7/30* (2006.01)
*H02K 24/00* (2006.01)
(Continued)

(52) U.S. Cl.
CPC .............. *H02K 24/00* (2013.01); *G01B 7/30* (2013.01); *G01D 5/20* (2013.01); *G05B 19/33* (2013.01); *G05B 2219/41065* (2013.01)

(58) Field of Classification Search
CPC . H02K 24/00; G01B 7/30; G01D 5/20; G05B 19/33; G05B 2219/41065
See application file for complete search history.

(56) References Cited

U.S. PATENT DOCUMENTS 7,174,270 B2 * 2/2007 Kokubo ............... G01D 18/001
73/504.07
8,344,723 B2 * 1/2013 Kamiya ................. G01P 3/488
324/207.25
(Continued)

FOREIGN PATENT DOCUMENTS

DE        10226974 A1    1/2004
DE      102010042134 A1   4/2012
(Continued)

OTHER PUBLICATIONS

International Search Report dated Mar. 24, 2020 in corresponding application PCT/EP2019/082840.

*Primary Examiner* — Thai T Dinh
(74) *Attorney, Agent, or Firm* — Muncy, Geissler, Olds & Lowe, P.C.

(57) ABSTRACT

A device for determining a first angle between a rotor and a stator, having inputs for reading amplitudes of electrical signals detected via a sensor system and representing a first angle, wherein the device has an angle estimator for estimating a second angle, the device determines amplitudes representing the second, estimated angle, the device has at least one controller with which at least one difference between the first angle and the second, estimated angle can be minimized, and the second, estimated angle can be provided via an output.

12 Claims, 4 Drawing Sheets

(51) Int. Cl.
    *G01D 5/20*    (2006.01)
    *G05B 19/33*    (2006.01)

(56) References Cited

U.S. PATENT DOCUMENTS

| | | | |
|---|---|---|---|
| 9,225,274 | B2 | 12/2015 | Lingenfelser et al. |
| 9,857,203 | B2 * | 1/2018 | Nakazato ........... G01D 5/24476 |
| 10,753,771 | B2 * | 8/2020 | Ando .................... G01D 5/2073 |
| 2017/0373617 | A1 | 12/2017 | Shimizu et al. |

FOREIGN PATENT DOCUMENTS

| | | |
|---|---|---|
| DE | 102011076734 A1 | 12/2012 |
| DE | 112015006003 T5 | 10/2017 |

\* cited by examiner

DEVICE, ARRANGEMENT AND METHOD FOR DETERMINING AN ANGLE BETWEEN A ROTOR AND A STATOR

This nonprovisional application is a continuation of International Application No. PCT/EP2019/082840, which was filed on Nov. 28, 2019 and which claims priority to German Patent Application No. 10 2018 130 972.4, which was filed in Germany on Dec. 5, 2018 and which are both herein incorporated by reference.

BACKGROUND OF THE INVENTION

Field of the Invention

The present invention relates to a device, an arrangement, and a method for determining an angle between a rotor and a stator.

Description of the Background Art

Rotor and stator are in particular parts of rotating electrical machines, with synchronous and asynchronous machines playing a predominant role here.

Modern drive technology, for example traction drive in electric vehicles, nowadays often uses permanently excited synchronous machines.

These include, for example, of a rotatably mounted permanent magnet positioned within a stator coil system. This generates a rotating field which sets the rotor in motion. In principle, the speed of the stator and the rotor is identical.

However, in order to provide a desired torque, a phase offset is set specifically so that the stator field leads the rotor by a certain angular offset. A consequence of this is the need to ascertain the rotor position angle.

Rotor position sensors are known from the prior art in various ways. Electromagnetic transducers, so-called resolvers, are used to convert the angular position of the rotor into an electrical variable. These are coil packages which are wound around coil supports, as stator windings. Rotatably mounted in the interior is a rotor which, Via a corresponding geometric configuration, influences the coupling of these coils as a function of the angle of rotation.

Alternative sensor concepts are based on inductive or magnetic principles, for example. Here, for example, potentiometer transmitters, incremental encoders or absolute encoders are known.

Resolver-based or inductive sensor types often use two-phase systems in which two stator windings are arranged offset from each other. If the rotor winding is excited with a sinusoidal AC voltage, the stator windings can be arranged in such a way that the amplitudes of the voltages induced in the stator windings correspond to the sine and cosine of the angular position of the rotor of the electrical machine under consideration.

The angular position $\phi$ is then calculated from the amplitudes $\alpha_1$ and $\alpha_2$.

By division and subsequent arc tangent calculation, the angle can be calculated back with the formula $$\Phi = \arctan\frac{\alpha_1}{\alpha_2}.$$

A disadvantage of this signal processing concept is a relatively long calculation time, since especially the division and the arc tangent calculation are very time-consuming. In addition, the sinusoidal and cosinusoidal signals must be corrected prior to calculating. In this case, at a minimum the signal offsets are compensated, and the amplitudes are adjusted. Especially with magnetic sensors, phase correction may also be necessary, subject to the physical measurement principle. All these steps have a negative effect on the signal propagation time.

Another disadvantage of the prior art is that the angles determined according to this principle are available after different propagation times. For example, in this case the control unit works with data that has passed through a processing time of varying length. This variation in the data has a negative effect on the accuracy of the targeted engine control. The longer the processing time, the older the measured value of the angle can be at a certain point in time. For example, if the control unit requires angle information cyclically and the calculation time is 50 µs, then the signal age will vary between 0 and 50 µs.

SUMMARY OF THE INVENTION

It is therefore an object of the present invention to provide a device for determining an angle between a rotor and a stator, to propose an arrangement for such a calculation, and to present a method for operating such a device, which makes it possible to perform an extremely fast angle determination that is virtually free of variations (jitter) in its calculation time.

A device according to the invention for determining a first angle between a rotor and a stator has inputs for reading amplitudes of electrical signals detected via a sensor system and representing a first angle, wherein the device has an angle estimator for estimating a second angle, the device has an asertainer for ascertaining amplitudes representing the second, estimated angle, the device has at least one controller with which at least one difference between the amplitudes representing the first angle and the amplitudes representing the second, estimated angle can be minimized, and the second, estimated angle is provided via an output.

Advantageously, it may be provided that the device can calculate, via for example, a calculator, the at least one difference. In this way, the amplitudes representing the first angle and the amplitudes representing the second, estimated angle are compared, and the result is again fed to the angle estimator.

It is possible for the device to ascertain the amplitudes representing the second, estimated angle via at least two channels.

The second, estimated angle is uniquely represented by two amplitudes calculated via two different channels and compared to the corresponding amplitudes of the first angle.

Therefore, it is possible that the control comprises the angle estimator as a controller and, via the angle estimator, the second, estimated angle can be varied until the amount of the differences of the amplitudes representing the first angle and the amplitudes representing the second angle is less than a specified value.

To enable fast signal propagation time, the error corrector of the sensor system is implemented at points of the device that have the least negative effect on the signal propagation time.

It is therefore advantageously provided that the device has a corrector for error correction of the sensor system, wherein the error correction can be performed by changing the amplitudes, phases and/or offsets of the read-in amplitudes representing the first angle.

In this case, the error correction of the read-in amplitudes is carried out before the read-in amplitudes are compared with the ascertained amplitudes.

In addition, or in lieu thereof, the device may include an error corrector for error correction of the sensor system, wherein the error correction can be performed by changing the amplitudes, phases, and/or offsets of the ascertained amplitudes representing the second, estimated angle.

In this case, the error correction of the ascertained amplitudes is performed before the ascertained amplitudes are compared with the read-in amplitudes.

In addition, or in lieu thereof, the device may include a corrector for error correction of the sensor system, wherein the error correction can be performed by changing the estimated angle.

In this case, the error correction is performed at the end of the closed-loop control and the second, estimated angle is corrected.

Furthermore, the invention relates to an arrangement for determining a first angle between a rotor and a stator. The arrangement according to the invention comprises a device according to the invention, a sensor system for detecting electrical signals and components for determining the amplitudes of electrical signals detected via the sensor system and representing the first angle.

For the detection of the electrical signals, it can be provided that the sensor system has several channels.

In addition, it can be provided that the sensor system operates inductively, capacitively, magnetically or according to another measuring principle.

It is possible that the error correction of the sensor system is already performed before the amplitudes representing the first angle are read in by the device. In this case, it may be provided that the arrangement has an error corrector for error correction of the sensor system, wherein the error correction can be performed by changing the amplitudes, phases and/or offsets of the detected electrical signals.

The method of operating a device according to the invention comprises: the amplitudes of electrical signals detected via a sensor system and representing the first angle are read in by the device; the angle estimator estimates the second angle ($\phi$_est); the amplitudes representing the second angle are ascertained; the at least one difference between the amplitudes representing the first angle and the amplitudes representing the second, estimated angle is calculated; the at least one difference is fed to the angle estimator; the angle estimator estimates a new second angle ($\phi$_est) taking into account the at least one difference; the process continues until the amount of the difference is less than a specified value; and/or the angle estimator provides the second, estimated angle via the output.

The advantage of the present invention is that it eliminates the need for time-consuming division and arc tangent calculations since a controller is used to determine the angle. The angle estimator varies the second, estimated angle until the ascertained amplitudes are nearly identical to the read-in amplitudes.

This enables extremely low signal propagation times, which should be at least ten times faster than the dynamics of the input signals.

Another advantage of this angle determination is a constant signal propagation time, so that variation is minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
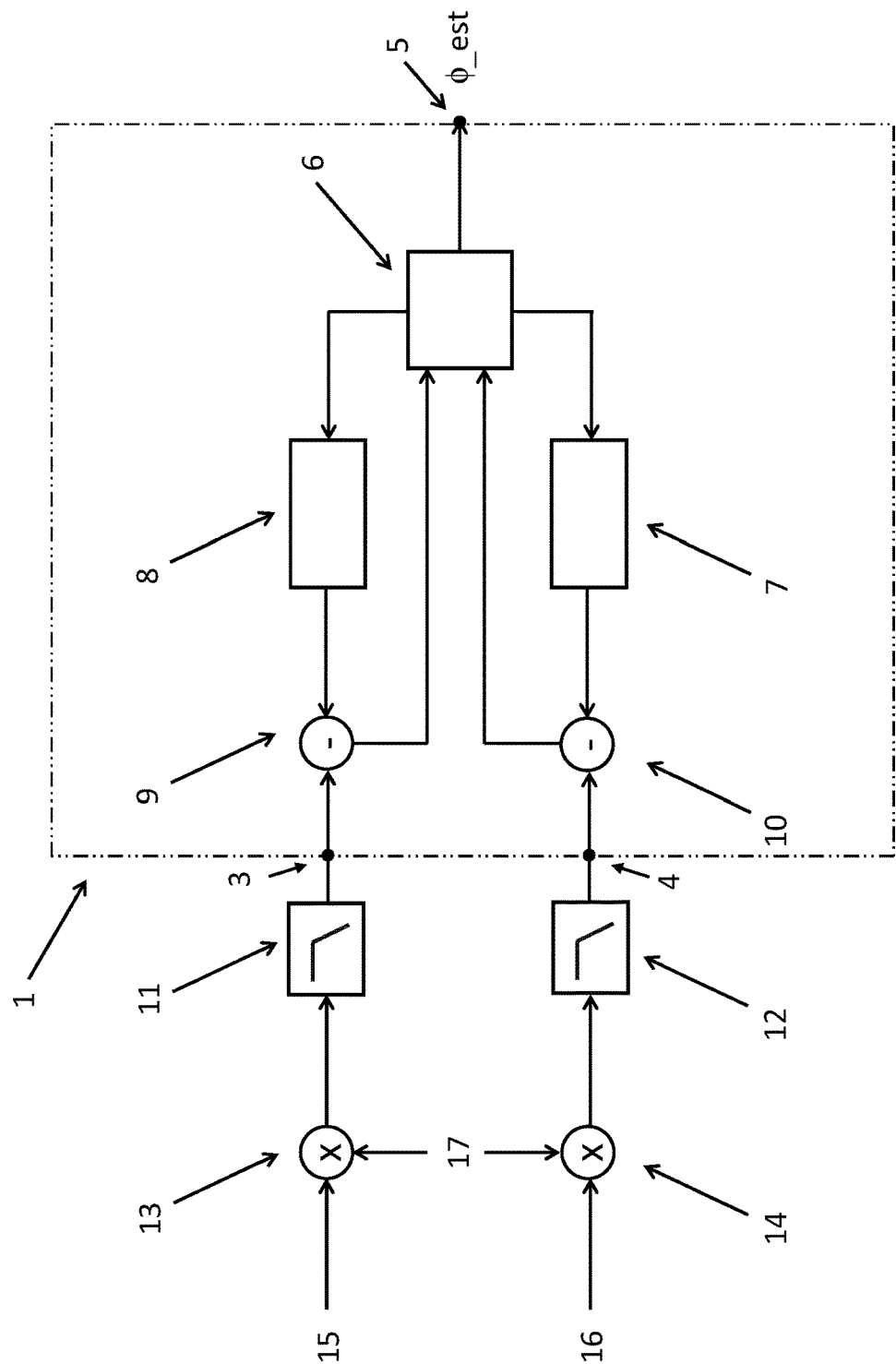
FIG. 1 is a block diagram of an arrangement according to the invention for determining an angle between a rotor and a stator

FIG. 1 shows a block diagram of a first arrangement 2 according to the invention for determining an angle $\phi$_est between rotor and stator.

The block diagram shows an arrangement 2 with two channels, which, however, can be applied without restriction to arrangements of a different number of channels.

The electrical signals 15, 16 detected by a sensor system are delivered to the arrangement 2. The sensor system is not shown in more detail in the present block diagram, since it is generally known in the prior art. The embodiment shown is based on a two-channel inductive sensor. Sensor systems with more or fewer channels and with other measuring principles, such as magnetic and/or capacitive measuring principles, are certainly conceivable here.

In principle, the sensor system in the case presented consists of an excitation coil to which an AC voltage is applied that has a frequency between 1 MHz and 10 MHz, preferably 3.5 MHz, and has amplitudes in the range of a few volts.

The excitation coil is preferably connected as a frequency-determining element in an LC resonant circuit and is preferably designed essentially in a spiral shape on a printed circuit board. Inside or outside the excitation coil there are two receiving coils which have an essentially identical geometry but are rotated at an angle $\tau$ to each other.

For two-phase systems, the following relationship applies:

$$\tau = \frac{360°}{4 * \Phi\_meas},$$

wherein $\phi$_meas represents the measuring range (uniqueness range) of the sensor, which is preferably an integer divisor of 360°. Via a rotatably mounted, electrically conductive element, which is placed at a distance from the coils, the electrical signals (voltages) induced in the receiving coils are influenced as a result of the electromagnetic alternating field of the excitation coil, as a function of the angle of rotation.

Since only the amplitudes 3, 4 of the electrical signals 15, 16 carry the required angular information, the arrangement 2 comprises an ascertainor for ascertaining the amplitude values 11, 12, 13, 14 of electrical signals 15, 16 detected via a sensor system.

In FIG. 1, the amplitudes are ascertained by synchronous demodulation with the carrier 17 (excitation signal). This is done by the multiplication of multipliers 13, 14 with the excitation voltage. This is followed by low-pass filtering 11, 12. These filters preferably have cutoff frequencies in the range of a few tens to a few hundred kHz.

Of course, other methods for ascertaining the amplitudes 3, 4 are also possible, such as digitizing the ascertained electrical signals and applying an algorithm for determining the maxima.

From the amplitudes 3, 4, the first angle $\phi$ can be ascertained according to known methods. The amplitudes 3, 4 are therefore representative for the first angle $\phi$.

At the inputs, the ascertained amplitudes 3, 4 are delivered to the device.

Instead of calculating an angle $\phi$ from the amplitudes 3, 4, the present embodiment uses an angle estimator 6 that estimates a second angle $\phi\_est$.

There are several approaches for estimating the second angle $\phi\_est$. It is conceivable that the last angle at which the electrical machine was switched off is used first. However, this would mean the use of a memory. Likewise, the second angle $\phi\_est$ can be guessed first. For this purpose, a random number generator can be used, for example. Furthermore, it is possible to take the value 0 as the starting value for the angle estimation in each case. Certainly, other methods for estimating the second, estimated angle $\phi\_est$ can also be considered.

The representative amplitudes 7, 8 are ascertained for this second, estimated angle $\phi\_est$.

The determination of the representative amplitudes 7, 8 can be done, for example, via a look-up table in which the amplitudes to the angles are stored. Other approaches are also conceivable here, such as possibly calculating the amplitudes.

The delivered amplitudes 3, 4 as well as the ascertained amplitudes 7, 8 are fed to at least one calculator for calculating a difference 9, 10, which constitutes the differences between the amplitudes 3, 4 representing the first angle $\phi$ and the amplitudes 7, 8 representing the second, estimated angle $\phi\_est$.

These differences 9, 10 are fed to the angle estimator 6 so that the angle estimator 6 can estimate a new second angle $\phi\_est$ taking into account the fed differences 9, 10. The process is continued until the amount of the difference 9, 10 is less than a specified value.

By the described method of recursion in the manner of a closed-loop control, the angle is determined from the representative amplitudes 3, 4 without time-consuming calculation, instead using recursive approximation to a desired value.

Since real systems are generally not ideal, it may be useful to make error corrections. In the inductive sensor system underlying the arrangement 2 according to the invention shown in FIG. 1, the errors may result, among other things, from tolerances (for example, eccentricity between rotor and stator), from temperature and/or aging effects, and from the design itself.

Figure 2:
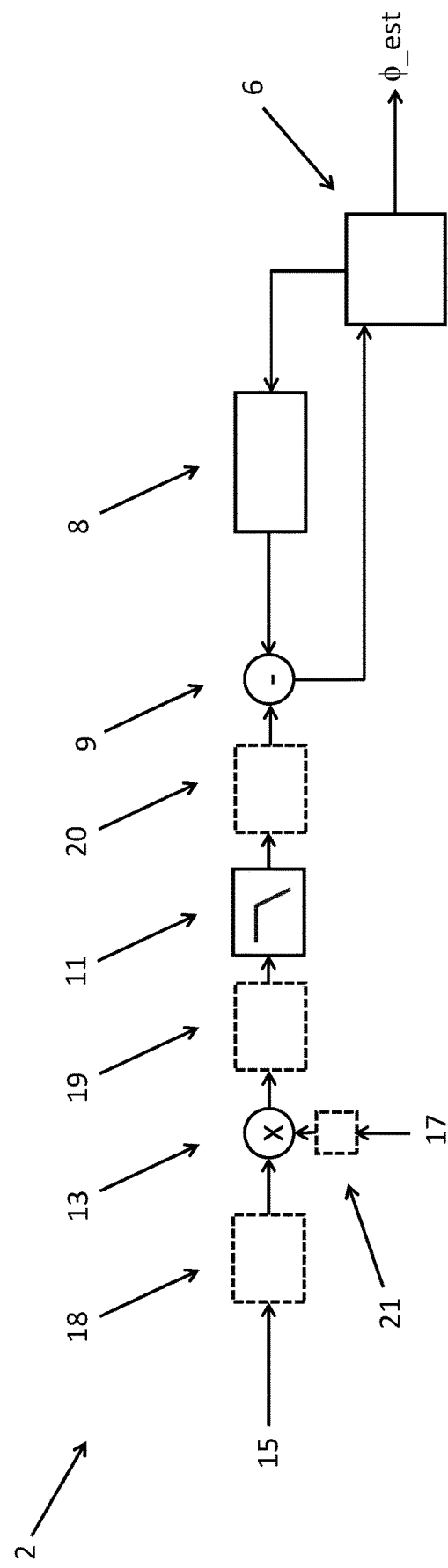
FIG. 2 is a block diagram of an arrangement according to the invention with a first corrector for error correction of the electrical signals or amplitudes detected via a sensor system and representing the first angle (representation of only one channel without loss of generality)

FIG. 2 shows a block diagram of an arrangement 2 according to the invention with a first error corrector for error correction 18, 19, 20, 21 of the electrical signals 15, 16 or amplitudes 3, 4 detected via a sensor system and representing the first angle $\phi$.

Only one channel is shown for reasons of clarity. Of course, all error correction options also apply to each additional channel.

FIG. 2 shows the upper channel of FIG. 1. The amplitudes 3, 4 of the detected electrical signals 15, 16 for a first angle $\phi$ are delivered to the device 1 via the inputs. The angle estimator 6 estimates a second angle $\phi\_est$ and the corresponding amplitude 8 is ascertained. The at least one difference 9 of the amplitude 8 is returned to the angle estimator 6.

The block diagram is extended by various options for error correction 18, 19, 20 of the electrical signals 15 or amplitudes 8 detected via a sensor system and representing the first angle $\phi$.

Error correction may be done before and/or after demodulation 13 of the detected electrical signals 15, wherein only one of these error corrections 18, 19, 20, or multiple error corrections 18, 19, 20, may be provided.

Via the error corrections 18, 19, 20 presented, it is possible to add or subtract DC or AC signals (such as higher harmonics) in order to change amplitudes, phases, and offsets of the read-in amplitudes 15 of the first angle $\phi$.

The error corrections 18, 19, 20, 21 can be implemented in the analog and/or digital part of an electronic evaluation system. It is also possible to take other influencing variables into account during error correction.

The error correction 21 to be performed may alternatively or additionally act on the carrier signal 17 and dynamically adjust it in amplitude, phase, offset or frequency.

Figure 3:
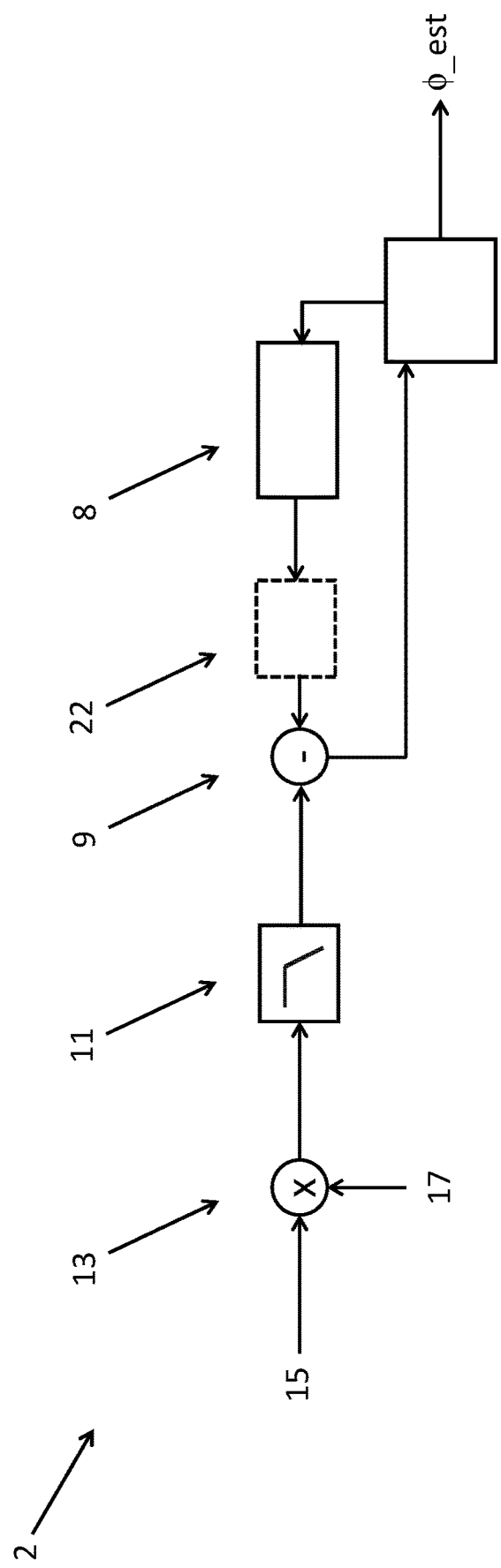
FIG. 3 is a block diagram of an arrangement according to the invention with a second corrector for error correction of the amplitudes representing the second, estimated angle (representation of only one channel without loss of generality)

FIG. 3 shows another option with a second error corrector for error correction 22 of the amplitudes 8 representing the second, estimated angle $\phi\_est$.

At this point, error correction 22 is performed subsequent to ascertaining the amplitude values 8 of the second, estimated angle $\phi\_est$.

The corrections made and the dependence on other influencing variables correspond to the explanations for FIG. 2.

Figure 4:
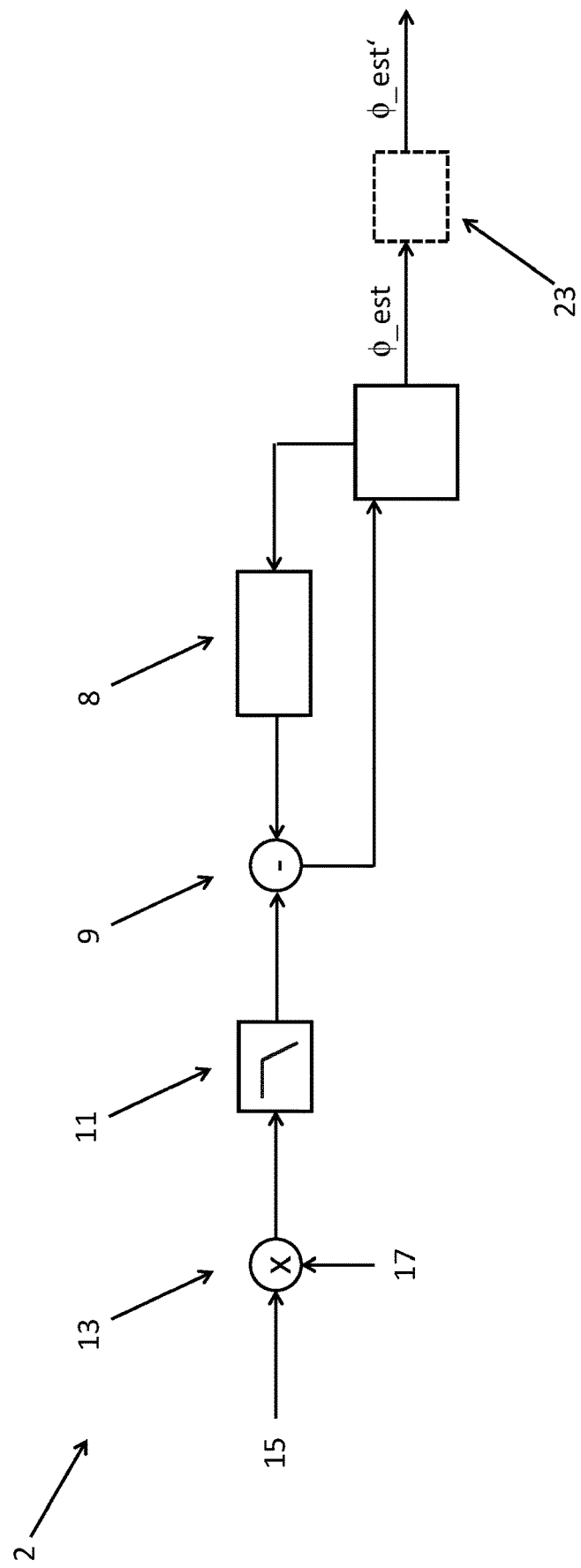
FIG. 4 is a block diagram of an arrangement according to the invention with a third corrector for error correction by changing the second, estimated angle (representation of only one channel without loss of generality)

FIG. 4 shows error correction with a third error corrector 23 by changing the second, estimated angle $\phi\_est$. At the end of the control, the output angle $\phi\_est$ is corrected and a new output angle $\phi\_est'$ is generated.

For example, the error correction 23 for the estimated angle $\phi\_est$ may include a look-up table (LUT) and assign a new output angle $\phi\_est'$ to each estimated angle $\phi\_est$. The stored LUT can be generated by different methods and optionally adjusted cyclically.

Among other things, calibration or known methods in the field of machine learning are conceivable here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A device to determine a first angle between a rotor and a stator, the device comprising:

at least one input for reading an amplitude of an electrical signal detected via a sensor system and representing a first angle;

an angle estimator to estimate a second angle;

an ascertainer to ascertain an amplitude representing the second, estimated angle;

at least one controller via which at least one difference between amplitudes representing the first angle and amplitudes representing the second, estimated angle is minimized; and an output to provide the second, estimated angle.

2. The device according to claim 1, wherein the device has a calculator to calculate the at least one difference.

3. The device according to claim 1, wherein the device ascertains the amplitudes representing the second, estimated angle via at least two channels.

4. The device according to claim 1, wherein via the angle estimator, the second, estimated angle is varied until the amount of the at least one difference between the amplitudes representing the first angle and of the amplitudes representing the second, estimated angle is less than a specified value.

5. The device according to claim 1, wherein the device has a corrector to error correct the sensor system, wherein the error correction is performed by changing the amplitudes, phases and/or offsets of the read-in amplitudes representing the first angle.

6. The device according to claim 1, wherein the device has an error corrector for error correction of the sensor system, wherein the error correction is performed by changing the amplitudes, phases and/or offsets of the ascertained amplitudes representing the second, estimated angle.

7. The device according to claim 1, wherein the device has an error corrector for error correction of the sensor system, wherein the error correction is performed by changing the second, estimated angle.

8. An arrangement for determining a first angle between a rotor and a stator, the arrangement comprising:

the device according to claim 1.

9. The arrangement according to claim 8, wherein the sensor system has at least two channels.

10. The arrangement according to claim 8, wherein the sensor system is designed inductively, capacitively, magnetically or according to another measuring principle.

11. The arrangement according to claim 8, wherein the arrangement has an error corrector for error correction of the sensor system, wherein the error correction is performed by changing the amplitudes, phases and/or offsets of the detected electrical signals.

12. A method of operating the device according to claim 1, the method comprising:

detecting the amplitudes of electrical signals via the sensor system representing the first angle;

estimating, via the angle estimator, the second angle;

ascertaining the amplitudes representing the second, estimated angle;

calculating the at least one difference between the amplitudes representing the first angle and the amplitudes representing the second, estimated angle;

providing the at least one difference to the angle estimator;

estimating, via the angle estimator, a new second angle while taking into account the at least one difference;

repeating until an amount of the at least one difference is less than a specified value; and providing, by the angle estimator, the new second, estimated angle via the output.

* * * * *